(12) United States Patent
Whipple et al.

(10) Patent No.: US 9,767,979 B2
(45) Date of Patent: Sep. 19, 2017

(54) CIRCUIT BREAKER HAVING LINE TERMINAL AND ASSOCIATED INDICATING METHOD

(71) Applicant: EATON CORPORATION, Cleveland, OH (US)

(72) Inventors: Michael Jerome Whipple, Rochester, PA (US); Edward Ethber Lias, Aliquippa, PA (US)

(73) Assignee: EATON CORPORATION, Cleveland, OH (US)

( * ) Notice: Subject to any disclaimer, the term of this patent is extended or adjusted under 35 U.S.C. 154(b) by 58 days.

(21) Appl. No.: 15/007,353

(22) Filed: Jan. 27, 2016

(65) Prior Publication Data

US 2016/0141135 A1 May 19, 2016

Related U.S. Application Data

(63) Continuation-in-part of application No. 13/893,745, filed on May 14, 2013, now abandoned.

(51) Int. Cl.
| | |
|---|---|
| *H01H 1/58* | (2006.01) |
| *H01R 13/641* | (2006.01) |
| *H01H 71/08* | (2006.01) |
| *H02B 1/056* | (2006.01) |
| *H01R 13/46* | (2006.01) |
| *H01H 71/02* | (2006.01) |
| *H01H 71/06* | (2006.01) |

(52) U.S. Cl.
CPC .......... *H01H 71/08* (2013.01); *H01H 1/5866* (2013.01); *H01H 71/0264* (2013.01); *H01H 71/06* (2013.01); *H01R 13/465* (2013.01); *H01R 13/641* (2013.01); *H02B 1/056* (2013.01)

(58) Field of Classification Search
CPC ...... H01H 1/5866; H01H 71/08; H01H 71/06; H01H 2071/088; H01R 13/465; H01R 13/641
USPC .................................................. 439/163, 489
See application file for complete search history.

(56) References Cited

U.S. PATENT DOCUMENTS

| | | | |
|---|---|---|---|
| 3,222,632 A | * | 12/1965 | Fuller .................. H01R 13/111 439/844 |
| 6,541,722 B1 | | 4/2003 | Whipple et al. |
| 7,009,126 B2 | | 3/2006 | Etscheidt et al. |
| 7,812,255 B2 | | 10/2010 | Garvin |
| 2010/0084188 A1 | | 4/2010 | Rajvanshi et al. |

* cited by examiner

*Primary Examiner* — Felix O Figueroa
(74) *Attorney, Agent, or Firm* — Eckert Seamans; John Powers; Grant Coffield

(57) ABSTRACT

A line terminal is for an electrical switching apparatus. The electrical switching apparatus includes a stationary contact and a movable contact structured to move into and out of engagement with the stationary contact in order to close and open the electrical switching apparatus, respectively. The line terminal includes a lip portion structured to be connected to the stationary contact in order to provide an electrical pathway therebetween; an arm portion extending from the lip portion, the arm portion having an engaging portion structured to receive and engage a conductive post member and provide an electrical pathway between the conductive post member and the stationary contact; a neck portion extending from the arm portion; and a tab portion extending from the neck portion and being located internal with respect to the engaging portion.

20 Claims, 5 Drawing Sheets

CIRCUIT BREAKER HAVING LINE TERMINAL AND ASSOCIATED INDICATING METHOD

CROSS REFERENCE TO RELATED APPLICATION

This application is a continuation-in-part application of and claims priority to U.S. patent application Ser. No. 13/893,745, filed May 14, 2013, entitled CIRCUIT BREAKER HAVING USE CONFIRMATION INSERT.

FIELD

The disclosed concept pertains generally to line terminals. The disclosed concept also pertains to electrical switching apparatus such as, for example, circuit breakers, that include line terminals. The disclosed concept also pertains to methods of indicating whether an electrical switching apparatus has been used in a panelboard.

BACKGROUND INFORMATION

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers). Such circuit breakers are used to protect electrical circuitry from damage due to a trip condition, such as, for example, an overcurrent condition, an overload condition, an undervoltage condition, a relatively high level short circuit or fault condition, a ground fault or arc fault condition.

There is room for improvement in line terminals and in electrical switching apparatus including line terminals. There is also room for improvement in methods of indicating whether an electrical switching apparatus has been used in a panelboard.

SUMMARY

These needs and others are met by embodiments of the disclosed concept, which are directed to a line terminal and an electrical switching apparatus including a line terminal, and an associated indicating method.

In accordance with one aspect of the disclosed concept, a line terminal for an electrical switching apparatus is provided. The electrical switching apparatus includes a stationary contact and a movable contact structured to move into and out of engagement with the stationary contact in order to close and open the electrical switching apparatus, respectively. The line terminal comprises a lip portion structured to be connected to the stationary contact in order to provide an electrical pathway therebetween; an arm portion extending from the lip portion, the arm portion having an engaging portion structured to receive and engage a conductive post member and provide an electrical pathway between the conductive post member and the stationary contact; a neck portion extending from the arm portion; and a tab portion extending from the neck portion and being located internal with respect to the engaging portion.

In accordance with another aspect of the disclosed concept, an electrical switching apparatus comprises a stationary contact; a movable contact structured to move into and out of engagement with the stationary contact in order to close and open the electrical switching apparatus, respectively; and a line terminal comprising a lip portion connected to the stationary contact in order to provide an electrical pathway therebetween, an arm portion extending from the lip portion, the arm portion having an engaging portion structured to receive and engage a conductive post member and provide an electrical pathway between the conductive post member and the stationary contact, a neck portion extending from the arm portion, and a tab portion extending from the neck portion and being located internal with respect to the engaging portion.

In accordance with another aspect of the disclosed concept, a method of indicating whether an electrical switching apparatus has been used in a panelboard having a conductive post member is provided. The electrical switching apparatus includes a stationary contact, a movable contact structured to move into and out of engagement with the stationary contact in order to close and open the electrical switching apparatus, respectively, and a line terminal. The line terminal includes a lip portion connected to the stationary contact in order to provide an electrical pathway therebetween, an arm portion extending from the lip portion and having an engaging portion, a neck portion extending from the arm portion, and a tab portion extending from the neck portion and being located internal with respect to the engaging portion. The method comprises the steps of extending the conductive post member through the engaging portion in order to provide an electrical pathway between the conductive post member and the stationary contact; moving the neck portion and the tab portion responsive to the extending step; and viewing the electrical switching apparatus.

BRIEF DESCRIPTION OF THE DRAWINGS

For a more complete understanding of the present invention, including its features and advantages, reference is now made to the detailed description of the invention taken in conjunction with the accompanying drawing in which.

DESCRIPTION OF THE PREFERRED EMBODIMENTS

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

A circuit breaker is an automatically operated electrical switch designed to protect an electrical circuit from damage caused by overload or short circuit. Its basic function is to detect a fault condition and, by interrupting continuity, to immediately discontinue electrical flow by opening the circuit. Generally, a circuit breaker includes a circuit body, an interrupter, and auxiliary elements. The interrupter is operable to terminate electrical flow where the load is outside the configured electrical parameters. Common interrupters include vacuum, gaseous, magnetic, thermal, and other types known in the art.

In desired operation, the interrupter terminates electrical flow when the electrical load is outside the pre-configured parameters (e.g., the circuit breaker is "tripped.") In practical operation, tripped breakers are often perceived as the reason that electrical equipment ceases to operate. In an attempt to remedy the situation, trained and untrained individuals often seek out the breaker panel and investigate therein. The individual often seeks to replace circuit breakers within the panel. However, when replacing circuit breakers, it is difficult to readily ascertain whether the replacement circuit breaker has been used, unless the circuit breaker is in packaging. This is often not the case in an operating environment.

It would also be advantageous to readily ascertain whether a circuit breaker has been used prior to deployment in a panel without having to resort to costly or time consuming forensic analysis. For at least the above reasons, it would be advantageous to have a circuit breaker with a use confirmation insert for ready ascertainment of prior use.

Figure 1:
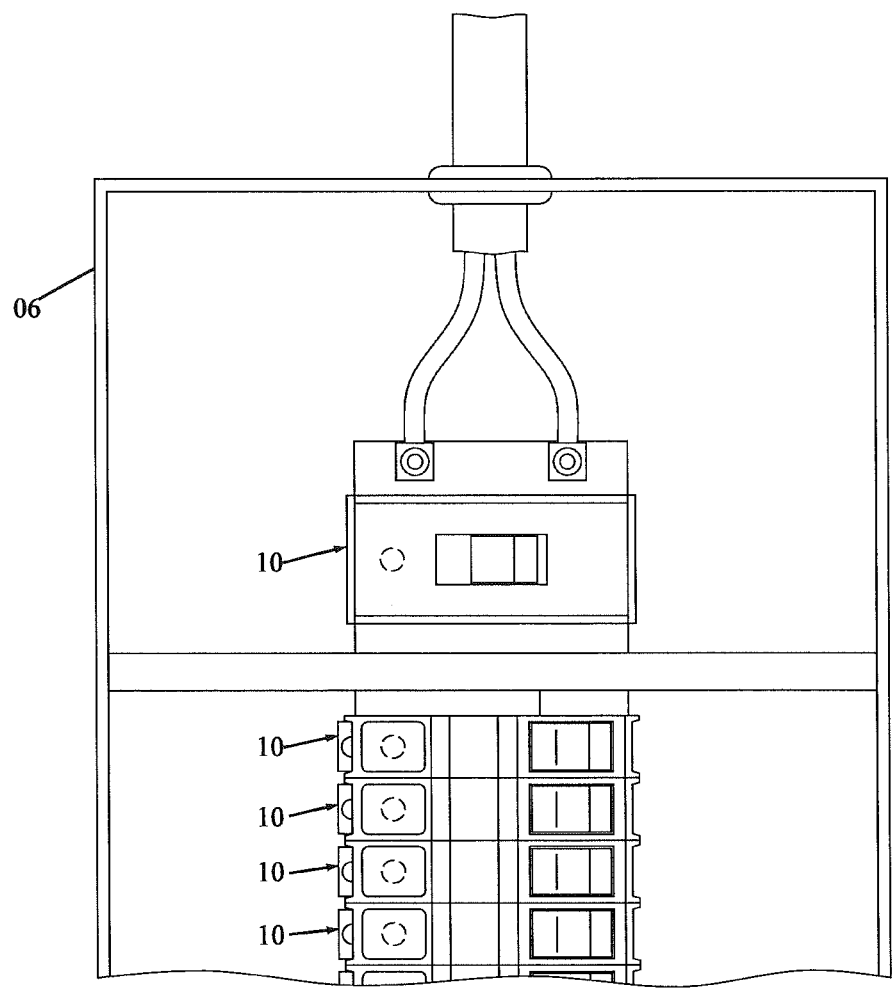
FIG. 1 illustrates a top view of a circuit panel having a plurality circuit breakers according to the current invention.

As stated in the brief description of the drawings, FIG. 1 illustrates the a top view of a circuit panel having a plurality circuit breakers according to the current invention.

Figure 2:
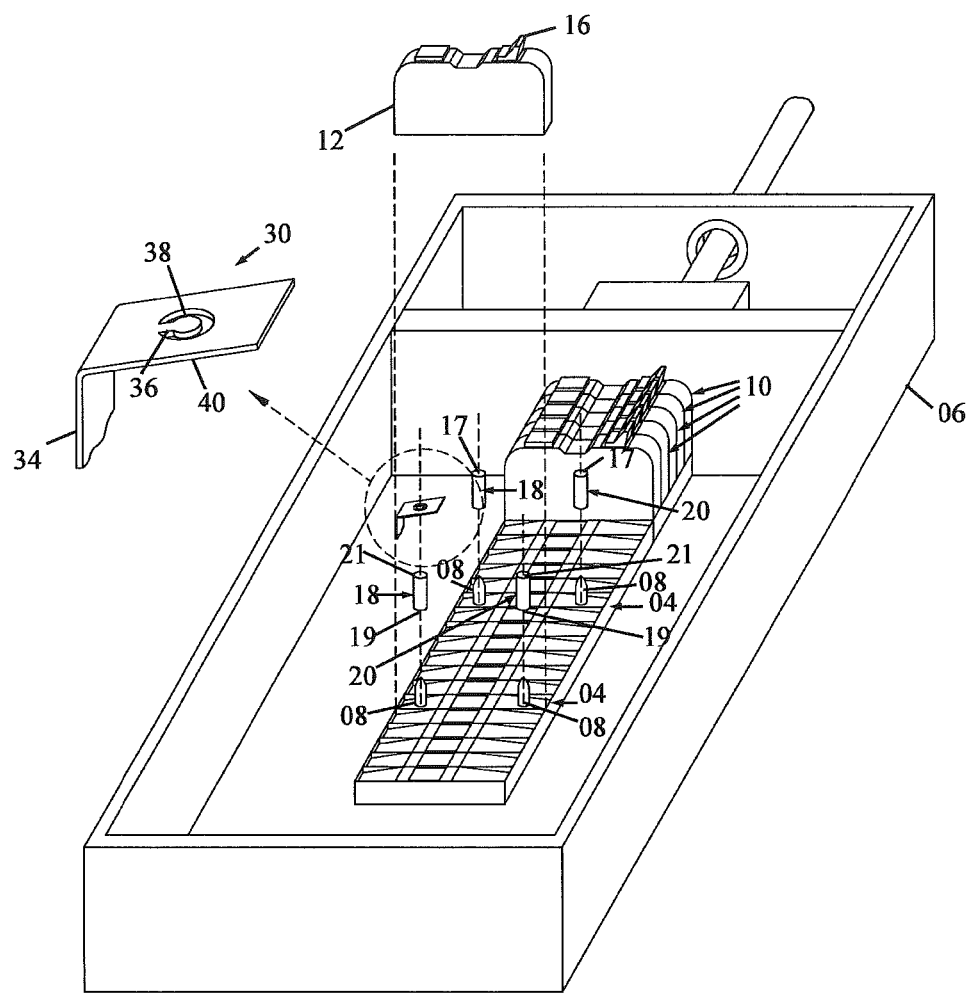
FIG. 2 illustrates a partial exploded view of a circuit panel and an embodiment of the current invention.

Now referring to FIG. 2, an embodiment of a circuit breaker 10 with a use confirmation insert 30 according to the current invention is disclosed. The circuit breaker 10 with use confirmation insert 30 provides a readily perceptible visual marker of prior use of the circuit breaker. Illustrated are the panelboard 06 with a plurality of slots 04, each slot 04 adapted for receipt of a circuit breaker 10. The depicted slots 04 and have a pair of power posts 08 operable to provide electricity and adapted for slidable engagement with a circuit breaker 10.

The circuit breaker 10 includes a breaker body 12, an interrupter (not pictured), and a use confirmation insert 30 (Please note that the figure only includes the major components of the circuit breaker for visual clarity). The breaker body 12 includes a housing composed of insulative material. In addition, the breaker body 12 presents an interior region operable to encompass the interrupter and use confirmation insert 30 and shield the interior region from the ambient environment. Optionally, it includes a manual reset switch 16 on its exterior surf ace.

Disposed in the interior region of the breaker body 12 is a first mounting hole 18 in communication with the interrupter, which in turn, is in communication with a second mounting hole 20. The interrupter is disposed in the interior region of the breaker body 12 and operable to terminate electrical flow through the circuit breaker 10. The interrupter includes vacuum, gaseous, magnetic, thermal, and other types of switches known in the art. The interrupter closes the circuit between the first mounting hole 18 to the second mounting hole 20 when the current is out of the pre-configured range of parameters.

The mounting holes 18 and 20 are dimensioned for slidable engagement with the power posts 08 of a slot 04 within the panelboard 06, enabling communication between the power posts 08 when the interrupter is in a closed circuit state. In an exemplary configuration, the mounting holes 18 and 20 are tubular, presenting a passage 17 and an inner circumferential surface for contact with the power posts 08. The mounting holes 18 and 20 have a lower opening 19 and an upper opening 21. Further, in the exemplary configuration, the mounting holes 18 and 20 are distal to each other, on opposing sides of the circuit breaker 10. Optionally, each mounting hole 18 and 20 includes a line terminal (shown in FIGS. 2-5) for more resilient contact with the power posts 08. The line terminal may present additional surface area, releasable fasteners, or other features known in the art.

Figure 3:
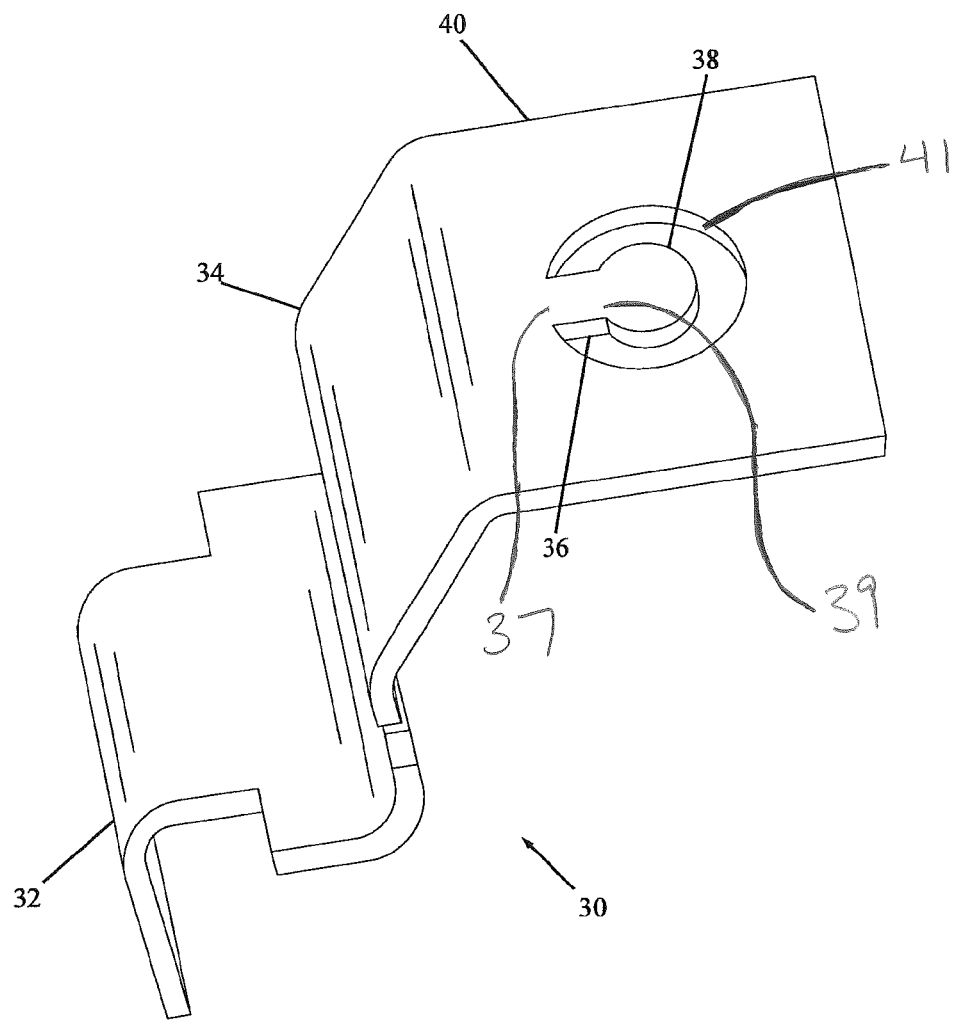
FIG. 3 illustrates a side perspective view of an embodiment of a use confirmation insert according to the current invention.

Now referring to FIG. 3, a use confirmation insert 30 is disposed proximate one of the mounting holes 18 or 20 (illustrated in FIG. 2). Although this embodiment employs only a single insert 30 paired with a mounting hole 18 or 20, it is within the spirit of this invention to pair an second insert 30 with the second mounting hole 18 or 20. The insert 30 provides a visual and haptic indicator of prior use of the circuit breaker 10. The insert 30 includes a lip 32, an arm 34, and a tab 38.

The lip 32 is a rigid surface which provides an anchor point for securing to the breaker body 12 (illustrated in FIG. 1). In the exemplary configuration, the lip 32 is a planar surface fixed to an interior sidewall of the breaker body 12.

A first end of the arm 34 is joined to the lip 32 and facilitates selective placement of the tab 38 relative to a mounting hole 18 or 20. The exemplary arm 34 is rigid and extends angularly and upwardly from the lip 32 a configured distance and angle in order to selectively and fixedly position the tab 38 relative to the passage 17 presented by the selected mounted hole 18 or 20.

A neck 36 extends from the second end of the arm 34. In this embodiment, the neck is composed of deformable material. Extending laterally from the neck 36 and distally to the arm 34 is a tab 38 covering at least a portion of the passage 17, lower opening 19, or upper opening 21 of the mounting hole 18 or 20, whereby the tab 38 detaches from the insert 30 upon receipt of the generally transverse force from slidable engagement of the circuit breaker 10 to the power posts 08 of the slot 04. In an exemplary configuration, the tab 38 has a greater width than the neck 36 and the width of the tab 38 is less than the width of the mounting hole 18 or 20. Optionally, the neck 36 has a less thickness than the tab 38, facilitating tab 38 detachment.

In a first configuration, the width of the tab 38 is slightly less than the width of the passage 17. In a second configuration, the width of the tab 38 is greater than the width of the passage 17, lower opening 19, upper opening 21. In a third configuration, the width of the tab 38 is less than half the width of the passage 17, facilitating passage 17 clearance and more resilient post 08 to mounting hole 18 and 20 contact.

In a further optional configuration, the neck 36 and tab 38 are integrated within a plate segment 40. The plate segment 40 includes an annular rim joined to the neck 36 abutting the tab 38 leaving a buffer space around the tab 38. The inner width of the rim corresponds to the width of the mounting hole 18 or 20. In the exemplary configuration, the combined neck 36, tab 38, and plate portion 40 are oriented in a generally planar configuration.

Referring back to FIG. 2, as mentioned, the tab 38 is selectively, fixedly placed to cover at least a portion of the passage 17, lower opening 19, or upper opening 21 of the mounting hole 18 or 20. In a first configuration, the tab 38 is fixedly placed above the upper opening 21 of the mounting hole 18 or 20. In another configuration, the tab 38 is fixedly placed below the lower opening 19 of the mounting hole 18 or 20. In yet another configuration, the tab 38 is fixedly placed in line with the mounting hole 18 or 20.

Figure 4:
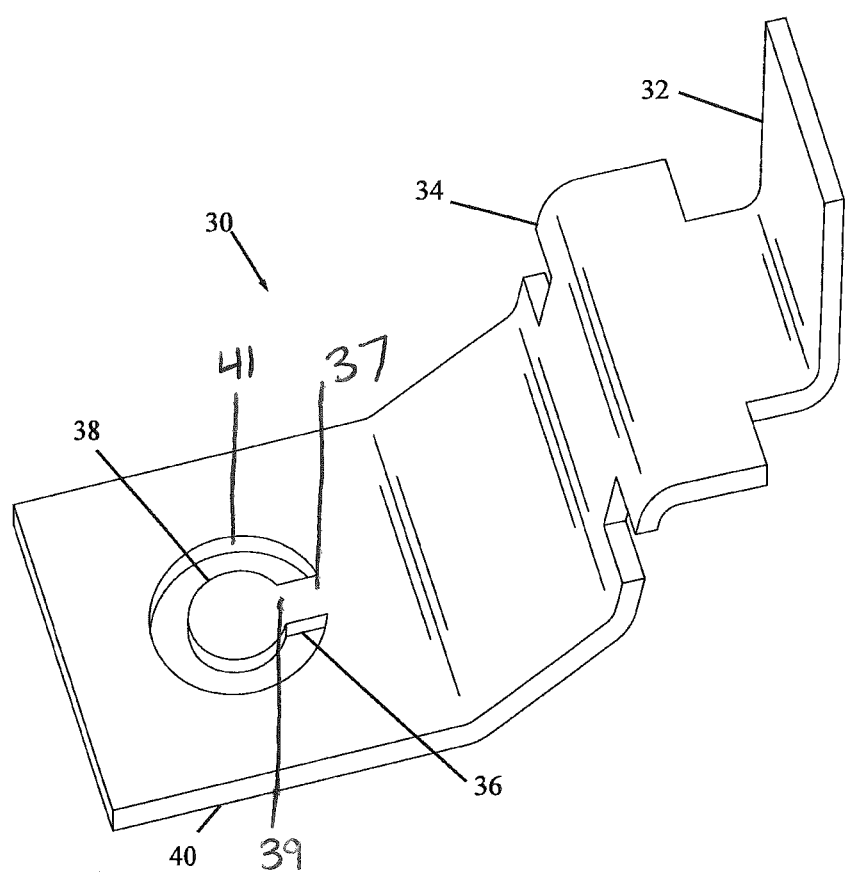
FIG. 4 illustrates a bottom perspective view of the embodiment of FIG. 3.

Now referring to FIG. 4 but with reference to FIGS. 1, 2 and 3, the circuit breaker 10 having a use confirmation insert 30 in a panelboard 06 is described. The circuit breaker 10 is brought proximate a panelboard 06 slot 04. The circuit breaker 10 is aligned such that its mounting holes 18 and 20 are aligned with power posts 08 of the slot 04. The circuit breaker 10 is slidably engaged to the power posts 08, whereby the power posts 08 contact and dislodge the tab 38 from the use confirmation insert 30, as shown in the plurality of circuit breakers 10 of FIG. 1. Upon disengagement from the slot 04, the tab 38 is no longer visible upon inspection of the circuit breaker 10, indicating prior use. Further, the resistive force provided by the tab 38 no longer exists, also indicating prior use of the circuit breaker 10.

In one example embodiment, the insert 30 is in the form of a line terminal 30 (i.e., the insert 30 and the line terminal 30 are one and the same component). The line terminal 30, shown in FIGS. 2-5, enables the circuit breaker 10 to electrically communicate with the power posts 08. That is, the line terminal 30 provides an electrical pathway between the circuit breaker 10 and the power post 08. Additionally, the line terminal 30 allows an operator to quickly and easily determine whether or not the circuit breaker 10 has been used.

The line terminal 30 includes the lip 32, the arm 34, and the neck 36 and the tab 38 which are integrated in the plate segment 40. The neck 36 includes opposing ends 37,39 (best shown in FIGS. 3 and 4), with the first end 37 extending from the arm 34 and the second end 39 extending from the tab 38. The plate segment 40 of the line terminal 30 further includes an engaging portion 41 that defines a thru hole to receive the power post 08. In the example embodiment shown in FIGS. 3 and 4, the engaging portion 41 is annular-shaped, although it will be appreciated that other suitable alternative geometries are within the scope of the disclosed concept. Furthermore, as shown, the tab 38 is located internal with respect to the engaging portion 41, a configuration which advantageously allows the tab 38 to be moved by the power post 08 and provide an indication of use. Referring to FIG. 2, it will be appreciated that in order to install the circuit breaker 10 in the panelboard 06, the power post 08 is inserted through the engaging portion 41, thereby dislodging the tab 38 from the line terminal 30. Simultaneously, the engaging portion 41 mechanically engages the power post 08, thereby providing an electrical pathway between the power post 08 and the circuit breaker 10.

Figure 5:
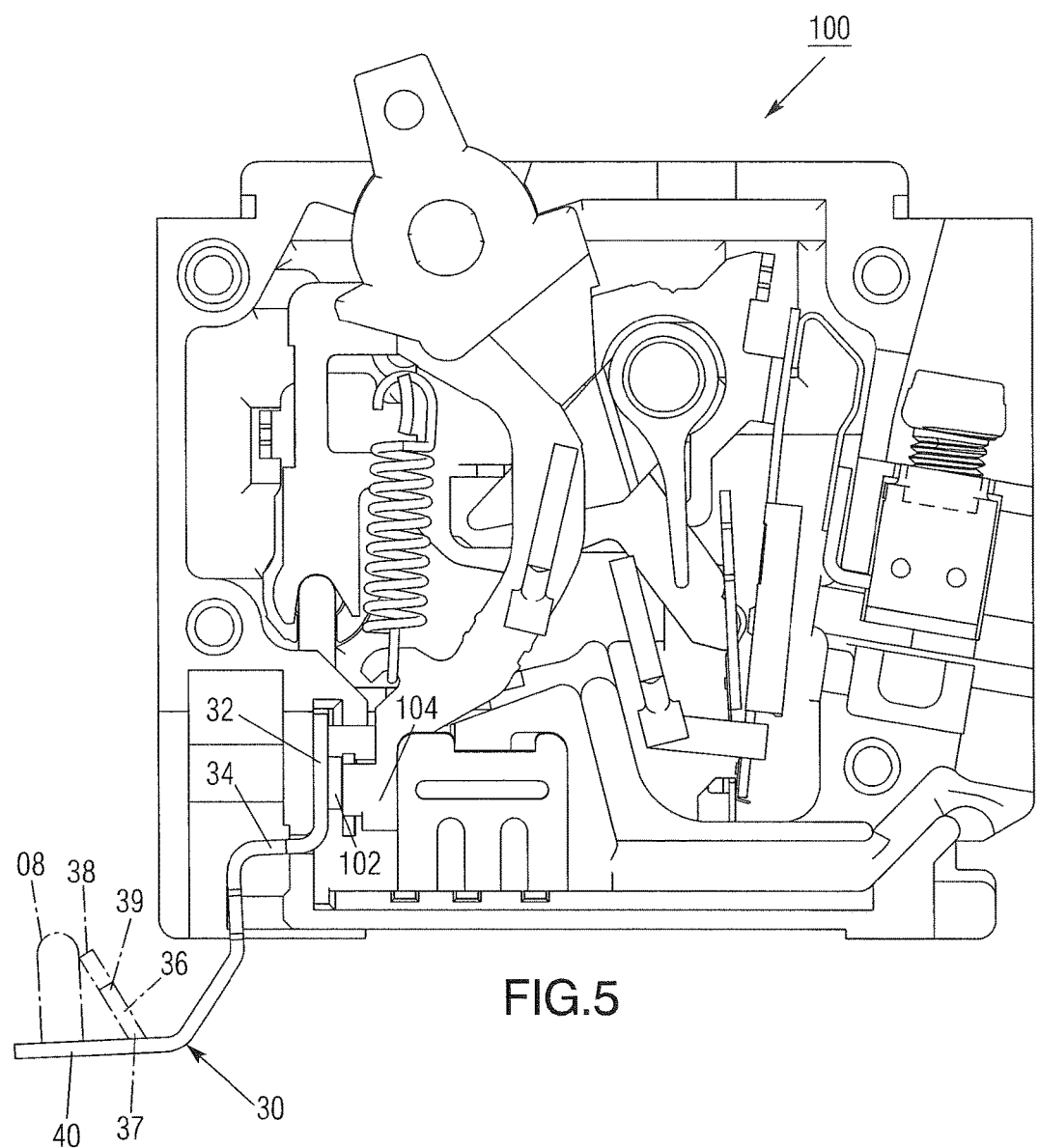
FIG. 5 illustrates a front elevation view of an electrical switching apparatus having a line terminal, shown with a conductive post member and with portions removed in order to see hidden structures, in accordance with a non-limiting embodiment of the disclosed concept.

FIG. 5 shows another example electrical switching apparatus (e.g., without limitation, circuit breaker 100) connected to one of the power posts 08 (shown in simplified form in phantom line drawing). The circuit breaker 100 includes a stationary contact 102, a movable contact 104 structured to move into and out of engagement with the stationary contact 102 in order to close and open the circuit breaker 100, respectively, and the line terminal 30. As shown, the lip 32 of the line terminal 30 is connected to the stationary contact 102 in order to provide an electrical pathway therebetween. The lip 32 is preferably connected to the stationary contact 102 at a suitable welded joint or a brazed joint, although it will be appreciated that any known or suitable alternative connection or engagement may be employed.

The example power post 08 is a conductive post member 08 that is mechanically coupled and electrically connected to the line terminal 30. More specifically, the engaging portion 41 (FIGS. 3 and 4) receives and engages the conductive post member 08 and provides an electrical pathway between the conductive post member 08 and the stationary contact 102. It will be appreciated that when the conductive post member 08 is extended through the engaging portion 41 (FIGS. 3 and 4), the neck 36 and the tab 38 (each shown in simplified form in phantom line drawing in FIG. 5) move with respect to the arm 34 and the lip 32. More specifically, the neck 36 and the tab 38 rotate about the first end 37 in a direction toward the lip 32. Accordingly, the line terminal 30 is structured to move between positions (i.e., a first position corresponding to the neck 36 and the tab 38 being parallel with the plate segment 40, as shown in FIGS. 3 and 4, and a second position, shown in simplified form in phantom line drawing in FIG. 5, corresponding to the neck 36 and the tab 38 having been moved by the conductive post member 08) responsive to engagement between the engaging portion 41 (FIGS. 3 and 4) and the conductive post member 08. It will also be appreciated that the line terminal 30 is a conductive bolt-on line terminal 30. As such, when a suitable coupling member (e.g., without limitation, a nut (not shown)) secures the conductive post member 08 to the line terminal 30, an electrical pathway is provided between the conductive post member 08 and the stationary contact 102 of the circuit breaker 100.

When the circuit breaker 100 is removed from the conductive post member 08, an operator will readily be able to determine that the circuit breaker 100 has been used in operation. More specifically, when the operator observes that the neck 36 and the tab 38 have been moved or rotated to the position shown in FIG. 5, or have been detached (i.e., in the event that extending the conductive post member 08 through the engaging portion 41 separates the neck 36 and the tab 38 from the arm 34, which is an event contemplated by the disclosed concept), the operator and any downstream users of the circuit breaker 100 will advantageously know that the circuit breaker 100 is not new, but has in fact been used, by virtue of the displaced or removed neck 36 and tab 38.

Accordingly, it will be appreciated that a method of indicating whether the electrical switching apparatus 100 has been used in the panelboard 06 includes the steps of extending the conductive post member 08 through the engaging portion 41 in order to provide an electrical pathway between the conductive post member 08 and the stationary contact 102, moving the neck 36 and the tab 38 responsive to the extending step, and viewing the electrical switching apparatus 100. The moving step also includes rotating the tab 38 and the neck 36 about the first end 37. Finally, the rotating step further includes rotating the tab 38 and the neck 36 in a first direction toward the lip 32.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A line terminal for an electrical switching apparatus, said electrical switching apparatus comprising a stationary contact and a movable contact structured to move into and out of engagement with said stationary contact in order to close and open said electrical switching apparatus, respectively, said line terminal comprising:

a lip portion structured to be connected to said stationary contact in order to provide an electrical pathway therebetween;

an arm portion extending from said lip portion, said arm portion having an engaging portion structured to receive and engage a conductive post member and provide an electrical pathway between said conductive post member and said stationary contact;

a neck portion extending from said arm portion; and a tab portion extending from said neck portion and being disposed internal with respect to said engaging portion.

2. The line terminal of claim 1 wherein said line terminal is structured to move between a FIRST position and a SECOND position; and wherein, when said line terminal moves from the FIRST position toward the SECOND position, said neck portion and said tab portion move with respect to said arm portion and said lip portion.

3. The line terminal of claim 2 wherein said line terminal is structured to move between the FIRST and SECOND positions responsive to engagement with said conductive post member.

4. The line terminal of claim 2 wherein said neck portion has a first end and a second, opposing end; wherein the first end extends from said arm portion; wherein the second end extends from said tab portion; and wherein, when said line terminal moves from the FIRST position toward the SECOND position, said neck portion and said tab portion rotate about the first end.

5. The line terminal of claim 4 wherein, when said line terminal moves from the FIRST position toward the second position, said neck portion and said tab portion rotate in a first direction toward said lip portion.

6. The line terminal of claim 1 wherein said line terminal is a bolt-on line terminal.

7. The line terminal of claim 1 wherein said line terminal is conductive.

8. An electrical switching apparatus comprising:
a stationary contact;
a movable contact structured to move into and out of engagement with said stationary contact in order to close and open said electrical switching apparatus, respectively; and
a line terminal comprising:
  a lip portion connected to said stationary contact in order to provide an electrical pathway therebetween,
  an arm portion extending from said lip portion, said arm portion having an engaging portion structured to receive and engage a conductive post member and provide an electrical pathway between said conductive post member and said stationary contact,
  a neck portion extending from said arm portion, and
  a tab portion extending from said neck portion and being disposed internal with respect to said engaging portion.

9. The electrical switching apparatus of claim 8 wherein said lip portion is connected to said stationary contact at a joint selected from the group consisting of a welded joint and a brazed joint.

10. The electrical switching apparatus of claim 8 wherein said line terminal is structured to move between a FIRST position and a SECOND position; and wherein, when said line terminal moves from the FIRST position toward the SECOND position, said neck portion and said tab portion move with respect to said arm portion and said lip portion.

11. The electrical switching apparatus of claim 10 wherein said line terminal is structured to move between the FIRST and SECOND positions responsive to engagement with said conductive post member.

12. The electrical switching apparatus of claim 10 wherein said neck portion has a first end and a second, opposing end; wherein the first end extends from said arm portion;

wherein the second end extends from said tab portion; and wherein, when said line terminal moves from the FIRST position toward the SECOND position, said neck portion and said tab portion rotate about the first end.

13. The electrical switching apparatus of claim 12 wherein, when said line terminal moves from the FIRST position toward the second position, said neck portion and said tab portion rotate in a first direction toward said lip portion.

14. The electrical switching apparatus of claim 8 wherein said line terminal is a bolt-on line terminal.

15. The electrical switching apparatus of claim 8 wherein said line terminal is conductive.

16. A method of indicating whether an electrical switching apparatus has been used in a panelboard having a conductive post member, said electrical switching apparatus comprising a stationary contact, a movable contact structured to move into and out of engagement with the stationary contact in order to close and open the electrical switching apparatus, respectively, and a line terminal, said line terminal comprising a lip portion connected to the stationary contact in order to provide an electrical pathway therebetween, an arm portion extending from the lip portion and having an engaging portion, a neck portion extending from the arm portion, and a tab portion extending from the neck portion and being disposed internal with respect to the engaging portion, the method comprising the steps of:
extending said conductive post member through the engaging portion in order to provide an electrical pathway between said conductive post member and said stationary contact;
moving said neck portion and said tab portion responsive to the extending step; and
viewing said electrical switching apparatus.

17. The method of claim 16 wherein said neck portion has a first end and a second, opposing end; wherein the first end extends from said arm portion; wherein the second end extends from said tab portion; and wherein the moving step further comprises:
rotating said tab portion and said neck portion about the first end.

18. The method of claim 17 wherein the rotating step further comprises:
rotating said tab portion and said neck portion in a first direction toward said lip portion.

19. The method of claim 16 wherein said lip portion is connected to said stationary contact at a joint selected from the group consisting of a welded joint and a brazed joint.

20. The method of claim 16 wherein said line terminal is a bolt-on line terminal.

* * * * *